3,773,892
METHOD AND APPARATUS FOR
BURNING GYPSUM
Gerhard Reimann, Mulheim (Ruhr), and Otto Friedrich
Wiechmann, Recklinghausen, Germany, assignors to
Rheinstahl AG, Essen, Germany
Filed Sept. 6, 1972, Ser. No. 286,821
Claims priority, application Germany, Oct. 23, 1971,
P 21 52 940.8
Int. Cl. F27b 15/00
U.S. Cl. 423—171
9 Claims

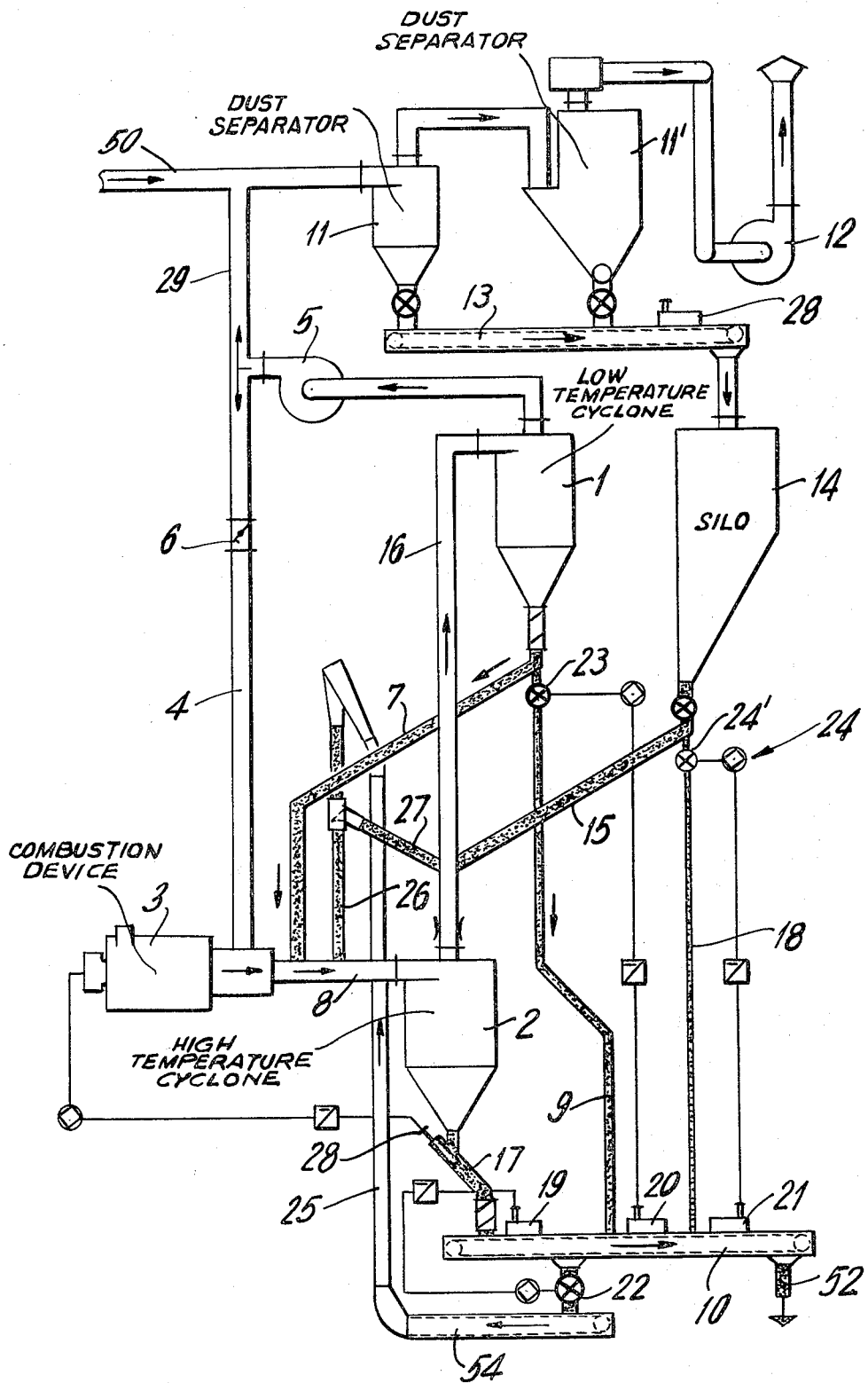

ABSTRACT OF THE DISCLOSURE

A method for burning gypsum in a heating gas current formed by heating a gas in a cyclone burning plant using a plurality of cyclones arranged in series comprises measuring the crystal water content of the material which issues from the individual cyclone stages and varying the portions of the total material flowing through the individual stages quantitatively in order to regulate the characteristics of the end product. The apparatus includes a plurality of cyclone heaters in which the raw material is treated and which are heated by heating gases which are generated in a combustion device and circulated in series through the cyclone heaters. A conveyor is movable through a path intercepting the discharges from each of the cyclone heaters extending from the highest temperature stage to the lowest temperature stage and a measuring device is arranged after each discharge to regulate the amount of the discharge in order to vary the constituency of the material fed to the conveyor or in accordance with the conditions which have been sensed by the measuring instruments.

BACKGROUND OF THE INVENTION

Field of the invention

This invention relates in general to a method and apparatus for burning gypsum, and in particular, to a new and useful method and apparatus for burning gypsum in a heating gas current in a cyclone burning plant which includes a plurality of cyclones discharging into a conveyor and with means for regulating the quantity of discharge in each stage in order to regulate the combined end product which is delivered at the end of the conveyor.

Description of the prior art

It is known to burn gypsum in a heating gas current formed by heating the gas in a cyclone burning plant with several cyclones preferably arranged in series and where the temperature in the entering heating gas is so regulated that it is slightly above the exit temperature of the material to be treated, preferably 1.1 to 2.0 times the exit temperature. The stay period for the material in the heating gas current is adjustable and arranged from 0.5 to 10 seconds and the reltaive humidity of the heating gas current related to the operating temperature is maintained particularly to an amount of from 40 to 95%. The raw material has preferably a grain size of up to 2 mm., with a preferred grain class of between 5 and 400 my. The object of such a method is to produce in one and the same plant and in continuous operation the various gypsum phases and modifications substantially separate from each other or in a desired mixture and also to produce special types of gypsum. In respect to the production of gypsum, which is composed for example of 42% anhydrite II, 13% anhydrite III, 33% hemihydrate, 2% dihydrate and 10% inert substance, and also in the production of individual phases and modifications thereof it was found that it was necessary to constantly supervise the composition both in respect to the end product and of the products of the various treatment phases. This supervision is also recommended for fixed treatment factors such as temperature, grain size, etc. Because the starting product frequently has varying water content (crystal water and free water) displacements of the portions of the various phases and modifications can appear in the end product despite constant treatment conditions and this will lead to different properties of the end product.

SUMMARY OF THE INVENTION

In accordance with the invention, an exact supervision of the product composition from the individual phases and modifications is possible as well as control of the production of a specific gypsum of a certain composition, independently of the variations of the starting materials. With the invention, it was found that the content of crystal water is an identification mark for the presence of various phases namely the anhydrite, the hemihydrate and the dihydrate in connection with the control of the burning process of the various modifications, namely of the alpha or beta modification. With the invention, the crystal water content of the material issuing from the individual cyclone stages is determined and the portions of the total material flowing through the individual stages are controlled quantitatively by the measured value in the sense of a certain composition of the end product from the various phases and modifications.

In another embodiment of the invention, the water content of the predried material is determined and the preliminary drying is so controlled by the measured value that practically no free moisture is contained in the raw material. The crystal water weight of the material is determined according to the invention by measuring the crystal water volume by means of the nuclear method of moisture measurement wherein the material density is determined by means of emitted gamma-rays.

The invention also comprises the regulation of the material by first measuring the material which issues from the last stage, or high temperature stage, and returning the material in a cycle into this preceding stage. In this way, the stay period of the material in the burning plant can be effectively extended so that high temperature gypsum (anhydrite II and III) is positively obtained in the high temperature stage.

The inventive apparatus includes a plurality of cyclone heaters in which the material is treated, each having a treated material discharge and including means for directing heating gases through the cyclone so that they operate at respective different temperatures from a last stage or high temperature stage down to the lowest temperature or first stage. The last stage has a discharge terminating at the head of the conveyor whereas the first stage terminates behind it in a direction of conveyance and a measuring instrument for measuring the crystal water content is arranged above the conveyor adjacent each discharge. A discharge device is provided behind the first measuring instrument arranged to return the material or portion thereof which arrives through the first discharge into the last or any preceding cyclone stage.

Accordingly, it is an object of the invention to provide an improved method of burning gypsum using a plurality of cyclone heaters through which a heating gas current is passed in series from a high temperature stage to a low temperature stage and wherein the crystal water content of the material which issues from each stage is determined and the portions of the material which flows out of each stage is varied in accordance with this determination in order to regulate the characteristics of the end product.

A further object of the invention is to provide a device for burning gypsum which comprises a plurality of cyclone treatment chambers which are heated by gases which are passed therethrough in series from a highest temperature cyclone to a low temperature operating cyclone and which includes a conveyor which moves through a path underlying each cyclone discharge in a measuring device for measuring the crystal water content of the material discharged from each cyclone and for varying the cyclone or the next adjacent cyclone in accordance with the measured amount.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustraed a preferred embodiment of the invention.

BRIEF DESCRIPTION OF THE DRAWING

The only figure of the drawing is a schematic elevational view of a device for burning gypsum constructed in accordance with the invention.

GENERAL DESCRIPTION OF THE PREFERRED EMBODIMENT

Referring to the drawings in particular, the invention embodied therein comprises a gypsum treatment plant which includes a plurality of cyclone treating devices including a first low temperature operating cyclone device 1 and a second high temperature operating cyclone device 2 which are interconnected by a heating gas conduit or pipe 16. Heating gases are produced in a combustion device 3 and they are delivered through a heating gas pipe 8 into the first cyclone 2. The temperature of the heating gases is controlled by a control circuit which includes a measuring instrument 28 which is arranged in the outlet or the discharge 17 of the high temperature cyclone 2. In addition, the combustion chamber of the combustion device 3 is connected through a gas return pipe 4 to a material delivery line 50 and it has a damper control 6 located between the combustion device and an exhaust fan 5 of the cyclone 1. Thus, a regulatable amount of exhaust gases may be fed into the combustion chamber through the gas return pipe 4, partly for the purpose of recycling some of the high temperature gases in order to conserve heat and partly to reduce the temperature of the hot combustion gases which are gnerated in the combustion device 3. The remaining exhust gases which are not returned are fed through line 29 and the conduit 50 to dust separators 11 and 11' which are connected together and to an exhaust fan 12.

Ground and dried raw material is delivered through the conduit 50 to the dust separators 11 and 11' and the separated material is delivered into a closed conveyor 13 which has a discharge into a silo or storage receptacle 14. The silo 14 has a bottom connection or discharge 18 which connects to conduit 15 into the heating gas pipe 16 leading to the cyclone 1. A small amount of the raw material arrives through a valve portion 13' of an adjusting device 24 and is delivered through the vertical discharge pipe 18 onto a conveyor 10 which comprises a conveyor for delivering the end product through an end product discharge connection 52.

The material which is discharged from the cyclone 1 after treatment is fed through the line 7 through the heating gas pipe 8 and thus, subsequently to the high temperature cyclone 2 and in addition a controlled amount is also fed down a discharge connection 9 directly to the conveyor 10. This latter amount comprises a low burnt gypsum. Conveyor 10 also receives the discharge from the high temperature cyclone 2 which moves through a discharge pipe 17 and this comprises a high burnt gypsum.

The conveyor 10 is thus charged directly by discharge pipes 17, 9, and 18 for the high temperature cyclone 2, the low temperature cyclone 1 and the silo 14, respectively, and the amounts which are directed downwardly through these discharges from each of the respective sources is controlled. For this purpose, the apparatus includes measuring and control devices 19, 20, and 21 which are located above thec onveyor 10 at locations adjacent (preferably downstream of) the discharge 17, the discharge 9, and the discharge 18, respectively. The measuring instruments measure the crystal water volume and the density of the material from which is obtained a crystal water weight. The measuring instruments 20 and 21 are connected to a control circuit for controlling dosing elements or valves 23 and 24 which are arranged in the discharge pipes 9 and 18, respectively. The measuring instrument 19 controls a discharge or valve 22 in the bottom conveyor 10 behind the measuring instrument 19. The discharge device connects into a conveyor device 54 which transfers the material which is delivered thereto from the high temperature cyclone 2 through a vertical conveyor sections 25 which connects through a down cover 26 into the line 8 leading to the high temperature cyclone 2. With this provision, the stay period for the material may be increased to make sure that anhydrite II and III are obtained in the high temperature stage. In order to be able to effect the return of the material in the low temperature cyclone 1, if necessary, there is provided a force line 27 which permits passage of some material from the line 25 into the heating gas pipe 16.

Another combination measuring device and control 28 is located above the conveyor 13 and it measures the water content and controls the preliminary drawing and grind drying of the raw material which is effected before the delivery line 50 in order to ensure that practically no mud or moisture is contained in the material which is treated.

All of the controls are regulated so that anhydrite phases I, II, and III are free of crystal water and that the hemihydrates have stoichiometrically a crystal water content of 6.21% by weight and the dihydrate phase has a crystal water content of 20.92% by weight.

The measuring instrument 19 determines whether the material issuing from the discharge pipes 17 of the cyclone 2 is free of crystal water which means that it consists only of an anhydrite. The measurement of the outlet exit temperature of the material by the measuring instrument 28 of the conveyor 13 provides information about the portions of anhydrite II and III contained therein. Anhydrite II is formed only at the burning temperature of 150 to 190° C. and anhydride III is formed at a burning temperature of from 400 to 600° C.

The measuring instrument 20 measures the crystal water content of the superposed layers of the material issuing from downpipes 17 and 9 (anhydrite and hemihydrate). Since the anhydrite is free of crystal water, the ratio of hemihydrate to anhydrite can be determined from the value of the crystal water content according to the following formula:

$$M_1 = \frac{6.21 \cdot x \text{ percent}}{1+x} \qquad (I)$$

where $M_1$ = crystal water content of the mixture in percent by weight measured in instrument 20
6.21 = stoichiometric crystal water content of the hemihydrate in percent by weight
1 = portion of anhydrite
$x$ = ratio of hemihydrate to anhydrite (II and III).

The measuring instrument 21 measures the crystal water content of the material issuing from all downpipes 17, 9, and 18 in superposed layers. From the value of the crystal water content, the instrument 20 can determine the ratio of the added dihydrate to the anhydrite according to the following formula, taking into account the preceding measuring value $M_1$, and so that the composition of the end product is also known:

$$M_2 = \frac{(1+x)M_1 + 20.92y}{1+x+y}$$

where $M_2$ = crystal water content of the mixture in percent by weight measured in instrument 21

20.92 = stoichiometric crystal water content of the dihydrate in percent by weight $y$ = ratio of the dihydrate to anhydride (II and III).

In practice the portions of the individual phases are determined in the laboratory for a gypsum composition found to be suitable, from these portions the crystal water contents to be maintained at the various measuring points are calculated by means of the formulas, and these values are set on the measuring and control devices as nominal values for the control.

By a corresponding connection of the control circuits it is naturally also possible to produce a single-phase gypsum.

While a specific embodiment of the invention has been shown and described in detail to illustrate the application of the principles of the invention, it will be understood that the invention may be embodied otherwise without departing from such principles.

What is claimed is:

1. A method for burning gypsum in a heating gas current formed by heating a gas in a cyclone burning plant, and using a plurality of cyclones arranged in series, comprising measuring the crystal water content of the material issuing from the individual cyclone stages and varying the portions of the total material flowing through the individual stages quantitatively to regulate the characteristics of the end product.

2. A method, according to claim 1, wherein the water content of the predried raw material which is to be heated is first determined and a preliminary drying is effected to ensure that the material has substantially no free moisture.

3. A method, according to claim 1, wherein the crystal water is determined by measuring the crystal water volume of the material delivered from each cyclone stage by means of a nuclear moisture measurement and by measuring the material density by means of emitted gamma-rays.

4. A method, according to claim 1, wherein each of the cyclones stages are heated by heating gases which are circulated from one stage to the next so that the first stage operates at a higher temperature, than the following steps, and including delivering the material which has been treated in each successive stage onto a conveyor which moves from the highest temperature stage toward the lowest temperature stages and delivers the end product off the end thereof, and including returning at least a portion of the material issuing from the high temperature stage backwardly into at least one of the stages for a retreatment therein.

5. A method, according to claim 4, wherein there is a high temperature stage and a lower temperature cyclone stage and a material silo all of which have discharges onto said conveyor and are arranged to discharge in order namely the high temperature cyclone, the low temperature cyclone and the silo onto the conveyor, and including measuring the crystal water content of the material delivered to the conveyor at locations adjacent each discharge and regulating the adjacent discharge and to return a portion of the regulated amount backwardly into the cyclone stage system in quantities in accordance with the measured conditions.

6. A device for burning gypsum comprising a plurality of cyclone heaters in which the raw material is treated each having a treated material discharge, means for directing heating gases through said cyclone heaters so that they operate at respective different temperatures, a conveyor movable through a path underlying each of said treated material discharges from the respective cyclones movable in a direction from the highest temperature cyclone to the lowest temperature cyclone, and a measuring means for measuring crystal water content of the material on said conveyor adjacent each discharge for varying amount of material delivered through said discharge to said conveyor.

7. A device, according to claim 6, including high temperature discharge means for discharging material from said conveyor located between the highest temperature cyclone heater and the next adjacent cyclone heater, said measuring means including a measuring device connected to said high temperature discharge means, and being operable in accordance with the water content to return a portion of said material through said high temperature discharge means.

8. A device, according to claim 6, including a material silo for receiving raw material to be treated, separating means for separating the dust from raw material and for delivering it to said silo, said silo having a silo discharge onto said conveyor downstream of said cyclone heaters, and said measuring means including a crystal water content measuring device adjacent said conveyor for measuring the material on said conveyors downstream of the discharge of said silo and connected to said silo discharge for regulating the amount of the discharge onto said conveyor.

9. A device, according to claim 8, wherein at least some of said cyclone heaters and said silo have a return connection in their respective discharges for returning a portion of the material delivered to said discharges back into said cyclone heaters.

References Cited

UNITED STATES PATENTS

| | | | |
|---|---|---|---|
| 1,798,857 | 3/1931 | Tyler | 423—171 |
| 2,934,328 | 4/1960 | Zvejnieks | 423—171 |
| 3,307,840 | 3/1967 | Conroy, Jr. | 432—15 |
| 1,912,910 | 6/1933 | Neuman et al. | 34—57 R |
| 2,907,668 | 10/1959 | Nies et al. | 423—172 |

JOHN J. CAMBY, Primary Examiner

H. C. YUEN, Assistant Examiner

U.S. Cl. X.R.

423—172, 178, 15; 34—57 R, 10